United States Patent
Schumacher et al.

(10) Patent No.: US 12,502,633 B2
(45) Date of Patent: Dec. 23, 2025

(54) FILTER ELEMENT FOR SEPARATING SOLIDS FROM LIQUIDS AND GASES

(71) Applicant: DrM, Dr. Müller AG, Männedorf (CH)

(72) Inventors: Ivo Schumacher, Mollis (CH); Urs Moser, Stäfa (CH); Philipp Rüegg, Wetzikon (CH)

(73) Assignee: DRM, DR. MULLER AG, Männedorf (CH)

( * ) Notice: Subject to any disclaimer, the term of this patent is extended or adjusted under 35 U.S.C. 154(b) by 433 days.

(21) Appl. No.: 18/251,560

(22) PCT Filed: Oct. 28, 2021

(86) PCT No.: PCT/IB2021/059953
§ 371 (c)(1),
(2) Date: May 3, 2023

(87) PCT Pub. No.: WO2022/101731
PCT Pub. Date: May 19, 2022

(65) Prior Publication Data
US 2024/0100459 A1 Mar. 28, 2024

(30) Foreign Application Priority Data
Nov. 16, 2020 (CH) .................................. 01460/20

(51) Int. Cl.
*B01D 46/02* (2006.01)
*B01D 46/24* (2006.01)

(52) U.S. Cl.
CPC ........ *B01D 46/026* (2013.01); *B01D 46/2411* (2013.01); *B01D 2201/186* (2013.01)

(58) Field of Classification Search
None
See application file for complete search history.

(56) References Cited

U.S. PATENT DOCUMENTS

| | | | | | |
|---|---|---|---|---|---|
| 1,594,335 | A | * | 7/1926 | Sweetland | B01D 25/02 208/179 |
| 1,646,377 | A | * | 10/1927 | Greenhalgh | B01D 25/02 210/93 |

(Continued)

FOREIGN PATENT DOCUMENTS

| | | | | |
|---|---|---|---|---|
| CA | 646598 A | | 8/1962 | |
| CA | 2835652 A1 | * | 1/2013 | B01D 29/111 |

(Continued)

OTHER PUBLICATIONS

International Search Report mailed on Jan. 18, 2022, in connection with International Application No. PCT/IB2021/059953 (5 pp., including machine-generated English translation).

*Primary Examiner* — Robert J Popovics
(74) *Attorney, Agent, or Firm* — McCormick, Paulding & Huber PLLC

(57) ABSTRACT

A filter element (5) for separating solids from liquids or gases is described, wherein the filter element (5) has a first perforated plate (1) and a second perforated plate (2), wherein the two perforated plates (1, 2) are arranged parallel to one another and are covered by a filter covering (3). In this case, the two perforated plates (1, 2) are displaceable in the longitudinal direction relatively to one another from a non-displaced state into a displaced state, and the plates (1, 2) have spacers (4) on the mutually facing inner sides, which spacers are constructed in such a manner that the spacing (D') between the plates (1, 2) is larger in the displaced state than in the non-displaced state (D), so that the filter covering (3) is tensioned in the displaced state of the plates (1, 2). In addition, at least one latching element (6) is provided, which fixes the plates (1, 2) to one another in the displaced state.

18 Claims, 7 Drawing Sheets

(56) References Cited

U.S. PATENT DOCUMENTS

| | | | | |
|---|---|---|---|---|
| 1,646,378 | A * | 10/1927 | Greenhalgh | B01D 29/41 210/342 |
| 1,718,390 | A * | 6/1929 | Sweetland | B01D 29/52 210/493.1 |
| 1,721,250 | A * | 7/1929 | Greenhalgh | B01D 25/02 210/93 |
| 2,813,632 | A * | 11/1957 | Muller | B01D 29/41 210/486 |
| 2,964,194 | A * | 12/1960 | Oliver, Jr. | B01D 33/23 210/486 |
| 3,079,001 | A * | 2/1963 | Griffith | B01D 29/41 210/488 |
| 3,263,819 | A * | 8/1966 | Schmidt | B01D 29/41 210/488 |
| 3,294,241 | A * | 12/1966 | Sicard | B01D 25/02 210/232 |
| 3,295,687 | A * | 1/1967 | Schmerler | B01D 29/39 55/379 |
| 3,480,149 | A * | 11/1969 | Houser | F16N 39/06 210/445 |
| 3,481,479 | A * | 12/1969 | Terhune | B01D 29/66 210/489 |
| 3,486,627 | A * | 12/1969 | Pearson, Jr. | B01D 29/39 210/486 |
| 3,753,712 | A * | 8/1973 | Janneck | B01D 61/30 210/500.33 |
| 3,963,621 | A * | 6/1976 | Newman | B01D 61/28 210/321.74 |
| 3,971,722 | A * | 7/1976 | Radford | B01D 33/23 210/489 |
| 4,053,417 | A * | 10/1977 | Newman | B01D 61/28 210/321.74 |
| 4,057,500 | A * | 11/1977 | Wager | E02B 11/005 210/170.07 |
| 4,136,011 | A * | 1/1979 | Joseph | B01D 29/05 210/171 |
| 5,035,799 | A * | 7/1991 | Rosberg | B01D 29/66 210/411 |
| 5,330,644 | A * | 7/1994 | Nilsson | B01D 33/23 210/324 |
| 5,609,761 | A * | 3/1997 | Franz | B01D 25/26 55/497 |
| 5,618,422 | A * | 4/1997 | Pelkio | B01D 33/23 210/323.1 |
| 6,010,014 | A * | 1/2000 | Nilsson | B01D 33/23 210/486 |
| 6,451,205 | B1 * | 9/2002 | McGaw, Jr. | B29C 66/1122 210/489 |
| 6,979,404 | B2 * | 12/2005 | Kopp | B01D 63/081 210/321.89 |
| 7,083,722 | B2 * | 8/2006 | McGaw, Jr. | B29C 66/133 210/489 |
| 7,143,899 | B2 * | 12/2006 | Varis | B01D 29/03 29/896.62 |
| 7,625,418 | B1 * | 12/2009 | Choi | B01D 29/07 210/493.1 |
| 7,794,594 | B2 * | 9/2010 | Diemer | B01D 25/26 210/486 |
| 8,128,824 | B2 * | 3/2012 | Diemer | B01D 25/26 210/486 |
| 9,937,448 | B2 * | 4/2018 | Yost | B01D 29/111 |
| 11,291,936 | B2 * | 4/2022 | Kim | F02M 37/44 |
| 11,446,594 | B2 * | 9/2022 | Wetter | B01D 46/0015 |
| 12,220,657 | B2 * | 2/2025 | Whitlock | B01D 25/26 |
| 2003/0121855 | A1 * | 7/2003 | Kopp | B01D 65/08 210/791 |
| 2003/0159981 | A1 * | 8/2003 | Diemer | B01D 25/26 210/486 |
| 2005/0061723 | A1 * | 3/2005 | Matsushita | B01D 39/1623 210/171 |
| 2008/0000827 | A1 * | 1/2008 | Bruss | B01D 63/0822 210/489 |
| 2014/0131291 | A1 | 5/2014 | Schumacher | |
| 2016/0339363 | A1 * | 11/2016 | Yost | B01D 35/027 |
| 2019/0374882 | A1 * | 12/2019 | Wetter | B01D 46/2403 |
| 2023/0249107 | A1 * | 8/2023 | Ono | A44B 18/0061 210/767 |
| 2024/0100459 | A1 * | 3/2024 | Schumacher | B01D 46/2411 |

FOREIGN PATENT DOCUMENTS

| | | |
|---|---|---|
| EP | 0 556 188 A1 | 3/1993 |
| EP | 2 283 907 A1 | 2/2011 |
| EP | 2 736 619 B1 | 5/2016 |

* cited by examiner

FILTER ELEMENT FOR SEPARATING SOLIDS FROM LIQUIDS AND GASES

CROSS-REFERENCE TO RELATED APPLICATIONS

This application is a National Stage application of International Patent Application No. PCT/IB2021/059953, filed Oct. 28, 2021, which claims priority to Swiss Patent Application No. 01460/20, filed Nov. 16, 2020, the disclosures of which each of which are incorporated herein by reference in their entirety.

TECHNICAL FIELD

The invention relates to a filter element for separating solids from liquids and gases, having two perforated plates, which are arranged parallel to one another and form an intermediate space between the two plates, and which are covered by a filter covering, and also a device for separating solids from liquids and gases, comprising at least one filter element.

BACKGROUND OF THE INVENTION

Filter elements for separating solid particles from liquids and gases, for installation into a pressure vessel in the form of a register, to which filter elements are fastened, are known. Such filter elements are provided for separating solids, particularly from liquids.

EP 0 556 188 describes a candle filter, in which filter candles with a cylindrical supporting fabric, which are combined in a register, are installed in a pressure vessel. The known candle filter is suitable for separating large solids quantities, but the filter elements take up too much volume in the case of small solids quantities, such that the pressure vessel becomes unnecessarily large and costly.

EP 2 283 907 A1 describes a device for filtering liquids using a filter element in the form of a cartridge, which is covered in a sealing manner using a plastic film and is operated in a supporting container. Due to the limited size of the filtration surface, this type of filtration is used for suspensions with a low solids content.

EP 2 736 619 B1 describes a device for separating solid particles from liquids by means of flat filter elements, arranged in one or more horizontal suspended registers, wherein the filter elements consist of a substantially flat support mesh and a filter medium, which is closed all round, and hanging spacers are arranged between the filter elements. Owing to the spacers, the filter elements are arranged at a sufficiently large spacing from one another, so that the filter cakes do not adhere to one another following the backflushing during the cleaning of the filter elements and hinder the cleaning. The spacers require a large volume and large pressure vessels.

The solutions shown from the prior art allow a separation of solids from liquids and gases in relatively large pressure vessels. The disadvantage of the prior art is that the filter elements, particularly the filter coverings, billow during backflushing during cleaning and there is the risk that filter cakes adhering to the filter elements stick together, as a result of which cleaning is prevented. To prevent this, large pressure vessels are used, which take up a lot of space and are expensive.

SUMMARY

The object of the invention is to create filter elements for separating solids from liquids and gases, which overcome the disadvantages mentioned and in which the filter coverings do not billow in such a manner during backflushing, that the function of the filter coverings is disrupted, that is to say that the filter cakes are not pressed against one another and do not stick together, or the filter elements do not warp. These filter elements have the advantage that they can be arranged at small spacing in a device, without the filter cakes, which adhere to the filter coverings, coming into contact during filtration. As a result, cleaning of the filter elements by backflushing is possible.

This object is achieved by a filter element according to the invention. A filter element for separating solids from liquids or gases is disclosed, wherein the filter element has a first perforated plate and a second perforated plate, wherein the two perforated plates are arranged parallel to one another and are covered by a filter covering. The two perforated plates are displaceable in the longitudinal direction relatively to one another from a non-displaced state into a displaced state and have spacers on the mutually facing inner sides, which spacers are constructed in such a manner that the spacing between the plates is larger in the displaced state than in the non-displaced state, so that the filter covering is tensioned in the displaced state of the plates. In addition, a latching element is provided, which fixes the plates to one another in the displaced state.

The device according to the invention enables the backflushing of the filter elements, without the filter coverings billowing substantially during the backflushing. Due to the displacement of the plates relatively to one another, the spacing between the plates is enlarged and the filter covering is tensioned, so that no substantial bulges form during the backflushing, which could disrupt the function of the filter elements.

The first and second perforated plate of the filter elements comprise openings over the entire surface of the plates, preferably in the form of holes, which allow the flow of the filtrate. The holes are preferably arranged at a regular spacing from one another. The plates are produced from a hard material, for example from stainless steel or hard plastic. Preferably, the plates are produced from a stainless steel. The hard plastic may for example be a thermoplastic or thermoset plastic, such as vinyl ester resin or epoxy resin. The plastics may also be reinforced with fibres, such as glass fibres for example.

The first plate preferably has an extension with a hole for accommodating a filtrate discharge pipe. The extension preferably has two flat plates, which are arranged parallel to one another and are arranged at a spacing from one another, wherein the extension is closed on three sides and open on one side and therefore forms a cavity. The cavity is connected via the fourth open side of the extension to the intermediate space between the first and second perforated plates. The hole in the extension is preferably sealed by means of a seal, preferably by means of a sealing ring, which seals the two plates of the extension and the filtrate discharge pipe with respect to one another. The seal has drainage holes, through which the filtrate can drain out of the intermediate space between the first and second perforated plates via the extension of the first plate into the filtrate discharge pipe. The filtrate discharge pipe likewise has drainage holes, which match up with the drainage holes of the seal, in order to enable an unobstructed filtrate drainage.

The second perforated plate preferably has a stop with a preferably rounded indentation on the one transverse side, which is arranged on the side of the filtrate drainage, wherein the stop can be pushed into the open side of the extension of the first plate. In the displaced state of the two plates, the rounded indentation preferably pushes against the sealing ring of the first plate and fixes the same in the desired position. On the transverse side opposite the filtrate drainage and the stop, the second plate preferably has an end strip, which has preferably one drilled hole. The end strip is used for closing the two plates in the displaced state and the drilled hole is used for accommodating a displacement mechanism, for example a screw, for displacing and latching the two plates in a desired displaced state. The displacement may also take place manually, for example by means of an extension rod.

The first and second perforated plates preferably have a guide rail on both longitudinal sides, which on the one hand laterally close the two plates and form a cavity, and on the other hand are used to guide the plates relatively to one another in the longitudinal direction during the displacement from a non-displaced state to a displaced state and hold the plates in position.

The filter covering is preferably produced from a woven fabric, non-woven fabric, felt or a membrane, preferably made from plastic or stainless steel. In a preferred embodiment, the filter covering is made from a plastic woven fabric. During use, the filter element is pushed into the preferably tubular filter covering and the filter covering is closed at the top and bottom, for example by welding or using a clamping device. The material of the filter covering is formed in such a manner that it is permeable for liquids and gases and at the same time, impermeable for solids. As a result, the solids are retained at the filter covering surface during filtration and form a filter cake, whilst the liquids or gases flow into the intermediate space between the two plates and from there drain as a filtrate via the filtrate discharge pipe. In the displaced state of the two perforated plates, the filter covering is tensioned, that is to say, the filter covering lies tautly around the two perforated plates. This has the advantage that the filter covering billows less during the backflushing of the filter elements than in the case of conventional filter elements with filter coverings.

The spacers of the two plates are preferably formed as indentations, which are orientated in the direction of the mutually facing inner sides of the plates. The spacers are preferably of substantially wedge-shaped construction. The spacers preferably have a tip and an oblique side surface, wherein the oblique side surface of the first plate and the oblique side surface of the second plate are preferably directed towards one another and run parallel to one another. In a particularly preferred embodiment, the tip of the wedge-shaped spacer is flattened.

The wedge-shaped spacer preferably has a drop-shaped or rectangular cross section or plan, wherein as a cross section, the sectional plane is understood as level with the plane of the plate. In a particularly preferred embodiment, the wedge-shaped spacer has a drop-shaped cross section or plan. The rectangular spacer preferably has an L-shaped longitudinal section.

Preferably, the tips of the wedge-shaped spacers of the two perforated plates are arranged offset to one another in the non-displaced state, and in the displaced state, the same preferably lie in contact with one another on top of one another. During the displacement of the two perforated plates relatively to one another in the longitudinal direction from a non-displaced state to a displaced state, the oblique side surfaces of the wedge-shaped spacers slide along one another, as a result of which, the spacing between the two plates enlarges until the tips of the two spacers lie on top of one another and the maximum spacing between the two plates is reached.

A latching element is understood to mean an element which latches in a latching position in such a manner in the displaced state of the two perforated plates of the filter element, that a fixed spacing exists and is maintained between the two plates. The latching element fixes the two plates with respect to one another in the displaced state.

In an embodiment, the latching element is formed by two opposite wedge-shaped spacers, which are latched into one another in such a manner in the displaced state of the perforated plates, that in the latching position, a fixed spacing exists between the two perforated plates. In this case, the tip of the spacers is preferably flattened. In the displaced state of the two plates, the opposite flattened tips of the spacers latch into one another and fix the plates at a certain spacing from one another.

Preferably, the latching element is a fastening mechanism, for example a screw mechanism, which is arranged on a transverse side of the perforated plates. Preferably, the fastening mechanism is formed by a threaded block and a screw, wherein the threaded block is preferably fastened to the first perforated plate by means of a sheet metal strip, and wherein the screw is guided through a drilled hole in an end strip on the transverse side, which is opposite a filtrate discharge pipe, of the second perforated plate. In this case, the screw latches in such a manner at a certain position, that the two plates are fixed in the displaced state at a desired spacing from one another. In a particularly preferred embodiment, the latching element is a combination of flattened tips of the spacers, which are latched into one another, and a fastening mechanism, preferably a screw mechanism.

A further subject of the present invention relates to a device for separating solids from liquids or gases, comprising a pressure vessel, a filtrate discharge pipe and at least one filter element according to the invention arranged on the filtrate discharge pipe. Preferably, the at least one filter element is arranged in a suspended manner on the filtrate discharge pipe. The device preferably comprises a plurality of filter elements, wherein the flat filter elements are connected to one another such that they are arranged parallel next to one another to form a filter packet, so that a large total filter area per unit volume is available, which is advantageous for the flow and the filter efficiency of the device. In addition, there is a predetermined clearance in each case between the individual filter elements over the majority of their vertical longitudinal extent.

In a further embodiment, the device for separating solids from liquids or gases has an outlet for the solids discharge, which is preferably arranged as a discharge nozzle in the lower region of the pressure vessel. This enables the simple removal of the separated solid, which collects in the lower region of the vessel owing to gravity during the backflushing of the filter elements through the filtrate discharge pipe.

The device according to the invention can be realized in different variants, wherein these variants differ principally in terms of the arrangement of the connections and the closure mechanism. Depending on the use, it is advantageous if the in- and outlets, also termed nozzles, can be arranged in the upper, lateral or in the lower region of the pressure vessel. These in- and outlets on the pressure vessel enable the filling and emptying of the pressure vessel with a suspension, flushing liquid or gases, or the drainage of the filtrate. These connections are sealed such in each case, that there is a sealed zone in the interior of the pressure vessel, so that an overpressure or vacuum can be formed.

In filtration processes, particularly in automated filtration processes, it is advantageous to detach the separated solid which has built up on the filter elements from the filter elements by means of backflushing. The backflushing of the filter elements may prevent the build-up of a dense layer of solid particles on the filter covering and thus lead to increased filter flow. In conventional filter elements with filter coverings, there is the disadvantage that the filter covering billows during the backflushing and the filter cakes come into contact. This is undesirable. The solution has hitherto been that the flat filter elements are arranged at a sufficiently large spacing from one another, in order to allow an improved backflushing and detachment of the solid particles from the filter elements. This leads either to fewer filter elements per pressure vessel and thus to less filtration efficiency or larger pressure vessels are required. The filter elements according to the invention enable backflushing without the filter coverings billowing significantly. Therefore, more filter elements can be used in a pressure vessel and the filtration efficiency is increased.

In addition, the present invention comprises the use of a filter element according to the invention in a device for separating solids from liquids or gases.

Combinations of two or more of the above-listed embodiments and variants are conceivable and claimed.

Further advantages of the invention emerge from the following description, in which the invention is explained in more detail on the basis of the exemplary embodiments illustrated in the schematic drawings.

DESCRIPTION OF THE PREFERRED EMBODIMENTS

Figure 1:
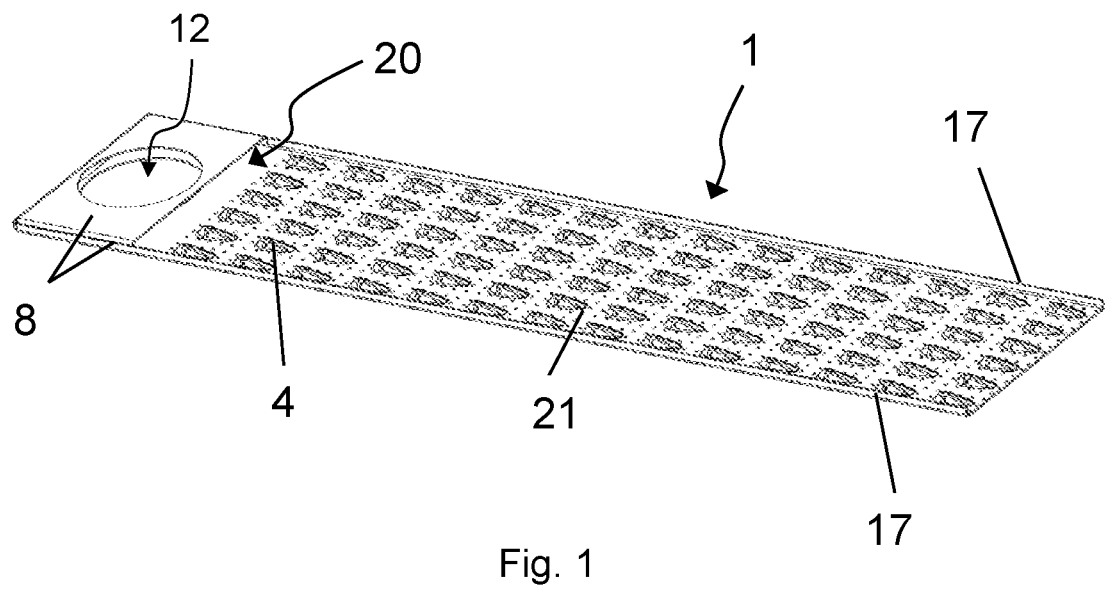
FIG. 1 shows the first perforated plate in a perspective view of the inner side of the plate.

FIG. 1 illustrates the first perforated plate 1 in a perspective view of the inner side of the plate 1. The first perforated plate 1 has openings 21 in the form of holes, which are distributed over the majority of the surface and enable the flow of the filtrate. The plate 1 is preferably produced from a stainless steel and has guide rails 17 on both of the longitudinal sides. The first perforated plate has a plurality of spacers 4, which are arranged at regular spacings from one another and respectively have the same shape. In FIG. 1, the spacers 4 are constructed to be substantially wedge-shaped and in a drop shape, with a flattened tip and an oblique side surface. In this case, the plate 1 has six spacers 4 per row and the entire plate has a different number of rows, depending on the length of the plate. In this embodiment, the plate has fourteen rows, each with six spacers 4. The first perforated plate 1 additionally has an extension 8 with a hole 12 for accommodating a filtrate discharge pipe (9, illustrated in FIG. 10). The extension 8 has two flat plates, which are arranged parallel to one another and are arranged at a spacing from one another. The extension 8 is closed on three sides and open on one side, and therefore forms a cavity. The cavity is connected via the fourth open side 20 of the extension to the intermediate space between the first and second perforated plates (not illustrated). The hole 12 is sealed via a sealing ring 14 (illustrated in FIG. 4).

Figure 2:
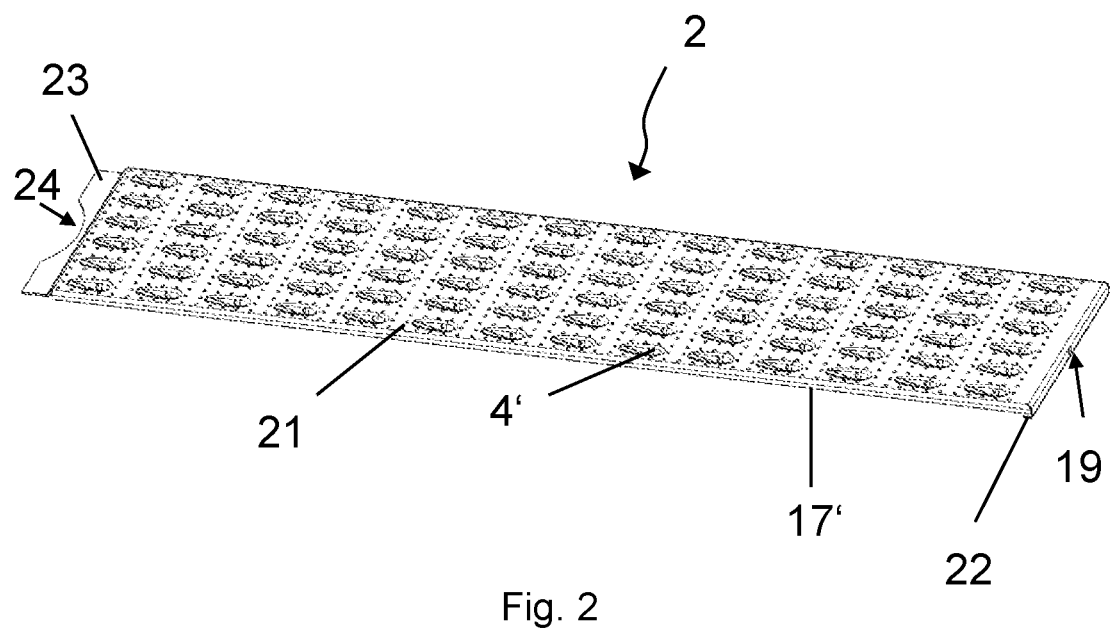
FIG. 2 shows the second perforated plate in a perspective view of the outer side of the plate.

FIG. 2 illustrates the second perforated plate 2 in a perspective view of the outer side of the second plate 2. Like the first plate 1 (illustrated in FIG. 1), the second plate 2 has openings 21 in the form of holes, which are distributed over the majority of the surface and enable the flow of the filtrate. The plate 2 is preferably produced from a stainless steel and has guide rails 17' on both of the longitudinal sides. The second perforated plate 2 has a plurality of spacers 4', which are arranged at regular spacings from one another and respectively have the same shape. In FIG. 2, the spacers 4' are constructed to be substantially wedge-shaped and in a drop shape, with a flattened tip and an oblique side surface. In this case, the plate 2 has six spacers 4' per row and the entire plate has a different number of rows, depending on the length of the plate. In this embodiment, the plate 2 has fourteen rows with six spacers 4'. The second perforated plate 2 additionally has a stop 23 with a rounded indentation 24 on the one transverse side, which is arranged on the side of the filtrate drainage, wherein the stop can 23 be pushed into the open side 20 of the extension 8 of the first plate 1 (illustrated in FIG. 1), and in the displaced state of the two plates, the rounded indentation 24 pushes against the sealing ring 14 (illustrated in FIG. 4) of the first plate and thus fixes the same. On the transverse side opposite the filtrate drainage and the stop 23, the second plate 2 has an end strip 22 with a drilled hole 19. The end strip 22 is used for closing the two plates in the displaced state and the drilled hole 19 is used for accommodating a screw for displacing and latching the two plates in a desired displaced state.

Figure 3A:
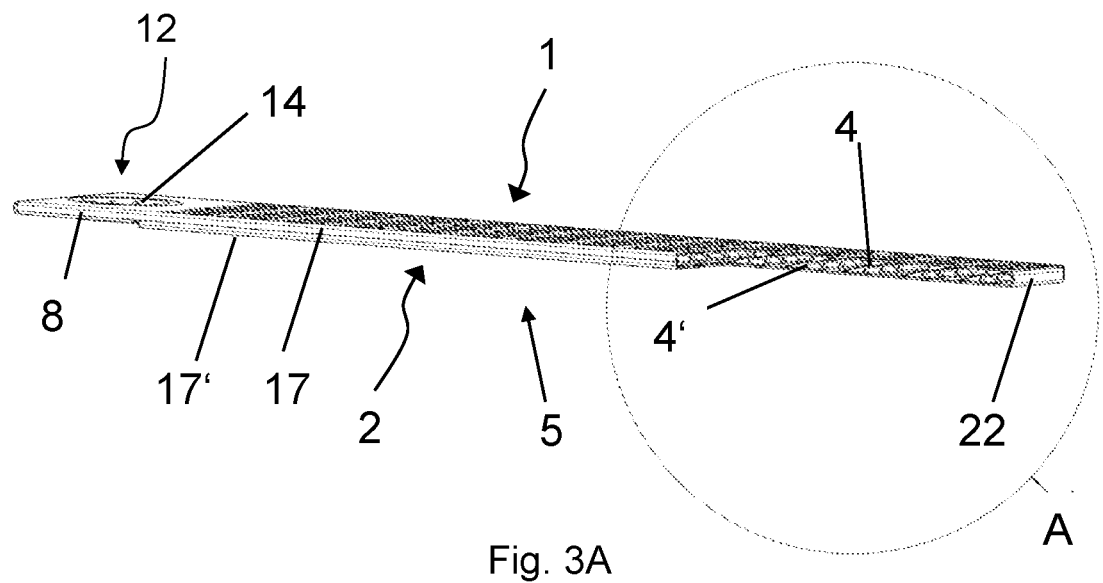
FIG. 3A shows the filter element in a perspective view with a partial view of a cross section through the first and second plates.

FIG. 3A shows a filter element 5 with a first perforated plate 1 and a second perforated plate 2 in a perspective view from obliquely above of the outer side of the first perforated plate 1 and also with a partial view A onto a cross section through the first plate 1 and second plate 2. With respect to the first perforated plate 1, the spacers 4, one of two guide rails 17, and also the extension 8 with the hole 12 and the sealing ring 14 are illustrated. With respect to the second perforated plate 2, the spacers 4', one of two guide rails 17', and also the end strip 22 are illustrated.

Figure 3B:
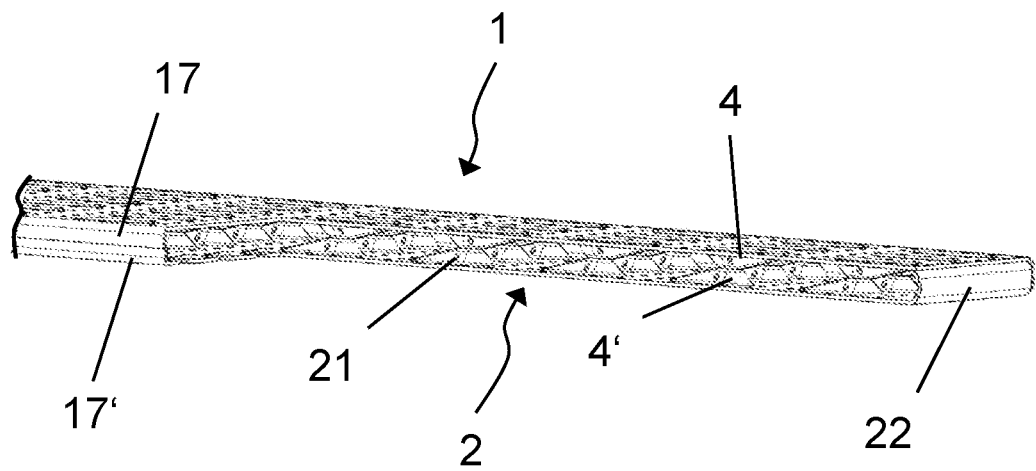
FIG. 3B shows a detail of the filter element in a perspective view of a cross section through the first and second plates.

The partial detail A from FIG. 3A is illustrated in FIG. 3B with the view of the cross section through the two plates 1, 2 in the displaced state. In this case, the guide rails 17 and the spacers 4 of the first plate 1 and also the guide rail 17', the spacers 4' and the end strip 22 of the second plate 2 are illustrated. The spacers 4 and 4' have openings 21 in the form of holes for the flow of the filtrate. The tips of the wedge-shaped spacers 4 and 4' are flattened and lie on top of one another in contact with one another.

Figure 4:
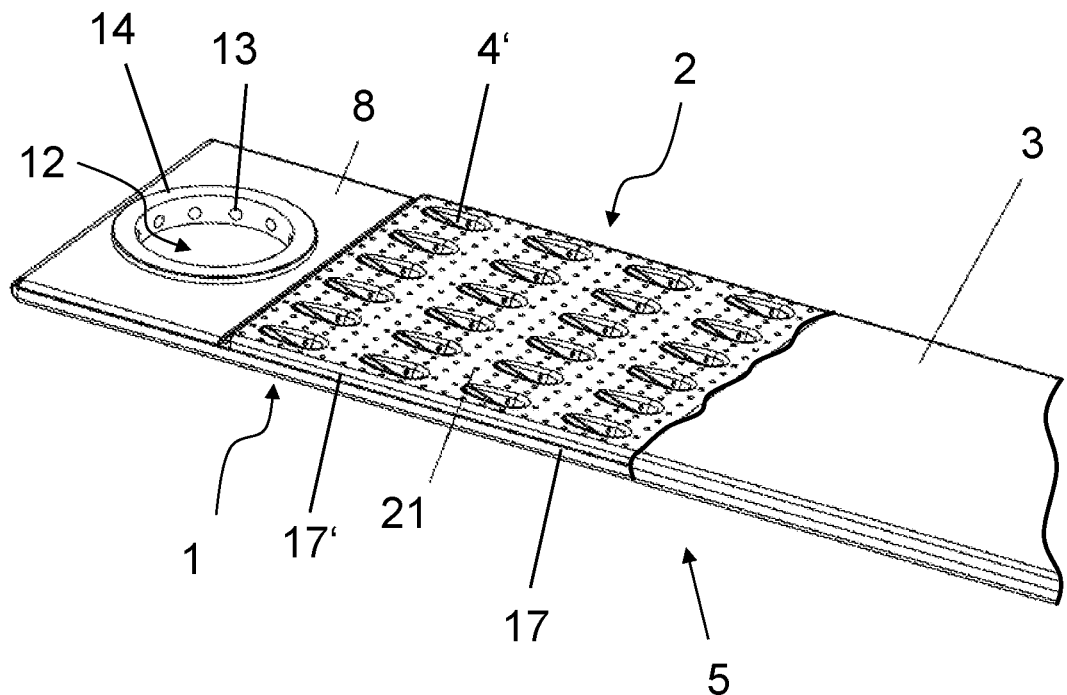
FIG. 4 shows a detail of the upper part of the filter element in a perspective view.

FIG. 4 shows a detail of the upper part of a filter element 5 in a perspective view with the first plate 1, the second plate and the filter covering 3. In this view, the first plate 1 is illustrated with the guide rail 17, the extension 8 with a hole 12, the sealing ring 14 and the drainage holes 13. The hole 12 in the extension 8 is sealed by means of a sealing ring 12, which seals the two plates of the extension 8 and the filtrate discharge pipe (not illustrated) with respect to one another. The sealing ring 14 has drainage holes 13, through which the filtrate can drain out of the intermediate space between the first and second perforated plates 1, 2 via the extension 8 of the first plate into the filtrate discharge pipe (not illustrated). The filtrate discharge pipe (not illustrated) likewise has drainage holes, which match up with the drainage holes of the sealing ring, in order to enable an unobstructed filtrate drainage. With respect to the second perforated plate 2, the spacers 4', the openings 21', and also the guide rail 17' are illustrated in this view. The filter covering 3 is only illustrated to some extent. The filter covering 3 essentially surrounds the two plates 1 and 2 completely during the use of the filter element 5. The filter covering 3 is pulled in a tubular manner over the two plates 1 and 2, closed at the top and bottom (not illustrated) and also sealed around the sealing ring 14 for the accommodation of the filtrate discharge pipe (not illustrated) and closed, so that the filtrate only flows through the filter covering into the intermediate space between the two plates and from there, via the sealing ring 14 with drainage holes 13 into the filtrate discharge pipe (not illustrated).

Figure 5:
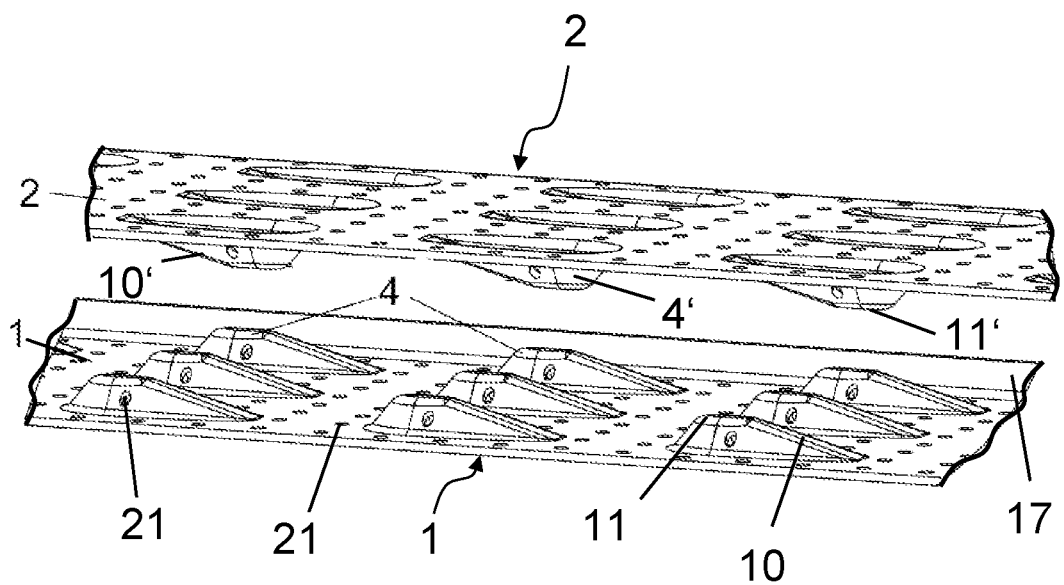
FIG. 5 shows a detail of the first and second perforated plates in a perspective view.

FIG. 5 shows a detail of the first plate 1 and the second plate 2 in the position before they are laid on top of one another. The first plate 1 has a guide rail 17, openings 21 and also a plurality of spacers 4, wherein the spacers 4 have a wedge-shaped drop-shaped form with an oblique side surface 10 and a flattened tip 11. The spacers 4' of the second plate 2 are likewise illustrated with the oblique side surface 10' and the flattened tip 11'.

Figure 6A:
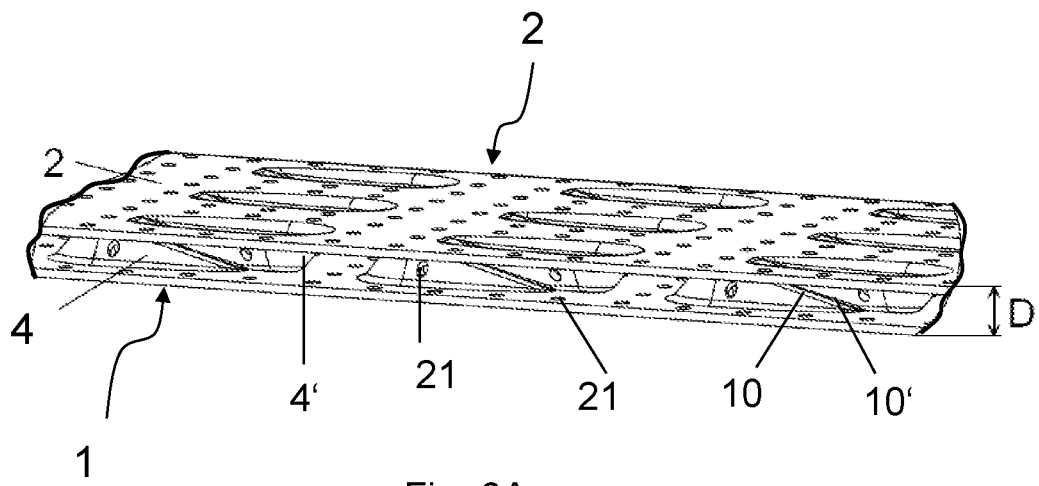
FIG. 6A shows a detail of a perspective view of a cross section through the first and second perforated plates in the non-displaced state.

FIG. 6A shows a detail of a perspective view of a cross section through the first perforated plate 1 with the spacers 4 with an oblique side surface 10 and the openings 21 and through the second perforated plate 2 with the spacers 4' with an oblique side surface 10'. FIG. 6A shows the two plates 1 and 2 in the non-displaced state. During the assembly, the two plates 1 and 2 are laid on top of one another, so that the spacers 4 and 4' are facing one another on the inner side of the plates 1, 2. The two oblique side surfaces 10 and 10' lie parallel to one another. The two oblique sides surfaces are preferably in contact. The rounded tips preferably rest on the opposite plate, so that in the non-displaced state of the plates, a spacing D is formed between the first perforated plate 1 and the second perforated plate 2. The filter covering (not illustrated) is slipped over the plates 1, 2 in this non-displaced state, wherein the woven fabric is not tensioned.

Figure 6B:
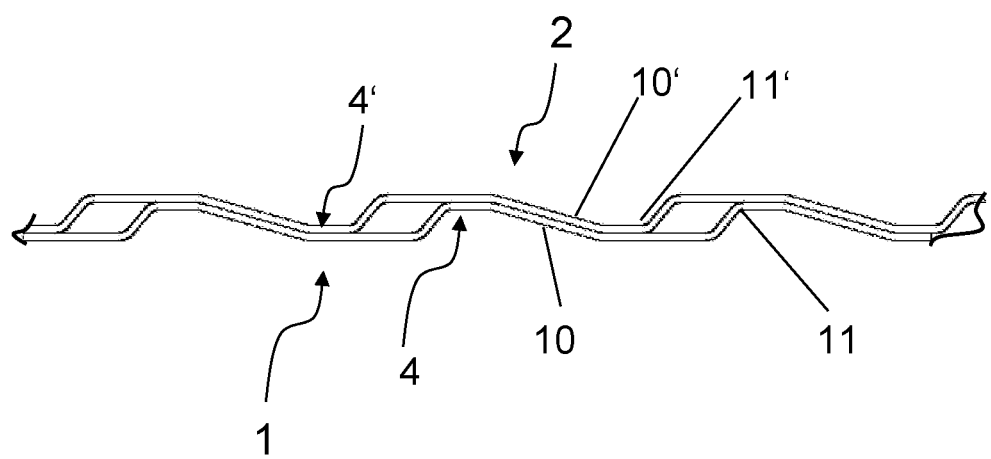
FIG. 6B shows a cross section through the first and second perforated plates in the non-displaced state.

FIG. 6B shows a cross section through the first and second plates 1, 2 in the same arrangement as described in FIG. 6A. The flattened tip 11 of the spacer 4 of the first plate 1 rests on the second plate 2. The flattened tip 11' of the spacer 4' of the second plate 2 rests on the first plate 1. The oblique side surface 10 of the spacer 4 of the first plate 1 touches the oblique side surface 10' of the spacer 4' of the second plate 2.

Figure 7A:
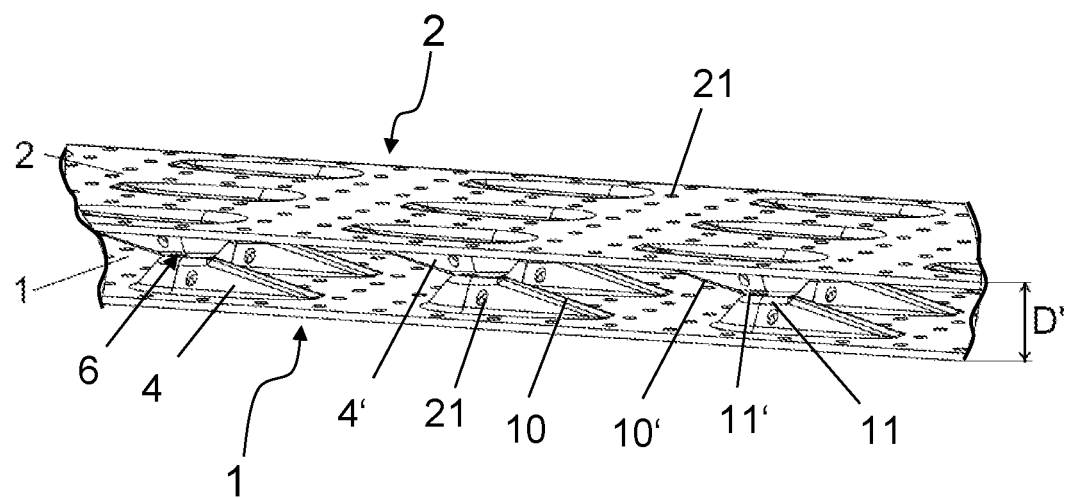
FIG. 7A shows a detail of a perspective view of a cross section through the first and second perforated plates in the displaced state.

FIG. 7A shows a detail of a perspective view of a cross section through the first perforated plate 1 with the spacers 4 with an oblique side surface 10 and the openings 21 and through the second perforated plate 2 with the spacers 4' with an oblique side surface 10'. FIG. 7A shows the two plates 1 and 2 in the displaced state. The plates 1, 2, which are lying on top of one another, are displaced either manually or by means of a displacement mechanism, for example a screw, into a displaced state, in which the oblique side surfaces 10, 10' slide along one another until the flattened tips 11, 11' lie on top of one another and the two plates 1, 2 are at a spacing D' from one another. The spacing D' is larger than the spacing D of the plates in the non-displaced state, as described in FIG. 6A. Due to the enlarged spacing between the two plates, the filter covering (not illustrated) is tensioned. Preferably, the perimeter of the filter covering is filled completely by the two plates. The woven fabric of the filter covering is tensioned in such a manner that the filter covering barely billows during the backflushing, so that the function of the filter elements is not disrupted.

Figure 7B:
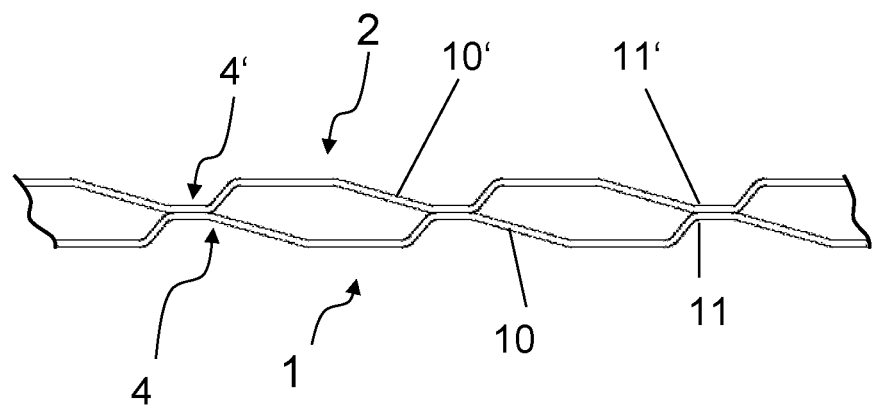
FIG. 7B shows a cross section through the first and second perforated plates in the displaced state.

FIG. 7B shows a cross section through the first and second plates 1, 2 in the same arrangement as described in FIG. 7A. The flattened tips 11 of the spacers 4 of the first plate 1 rest on the flattened tips 11' of the spacers 4' of the second plate 2.

Figure 8:
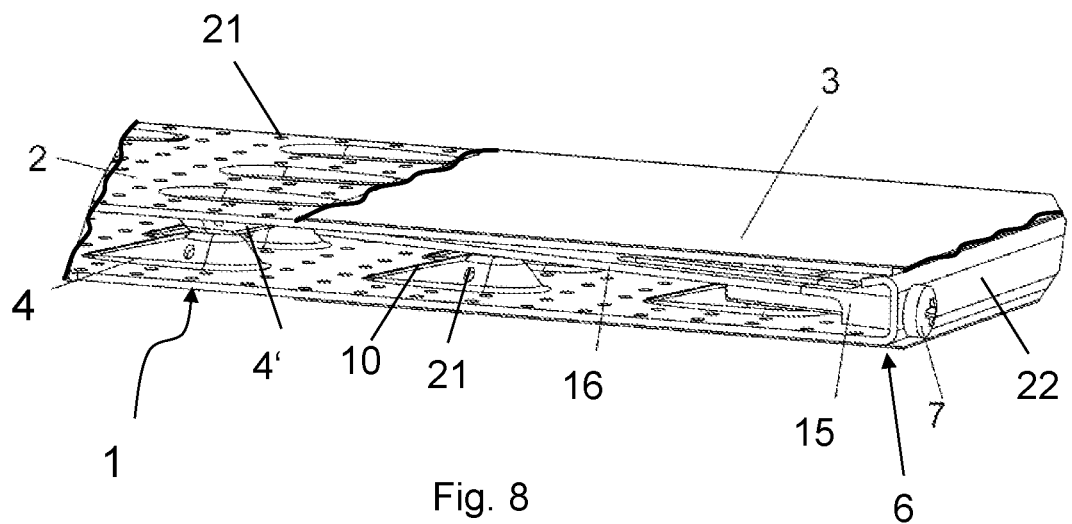
FIG. 8 shows a detail of a perspective view of a cross section through the first and second perforated plates with latching element.

FIG. 8 shows a detail of a perspective view of a cross section through the latching element 6 of the first and second plates 1, 2 in the displaced state. The latching element 6 is a screw mechanism and is formed by a threaded block 15 and a screw 7. The threaded block 15 is fastened via a sheet metal strip 16 to the first perforated plate 1. The screw 16 is guided through the drilled hole 19 (illustrated in FIG. 2) in the end strip 22, wherein the end strip is arranged on the transverse side of the second perforated plate 2, which is opposite the filtrate drainage. In the non-displaced state of the filter element, the screw 7 is guided through the drilled hole into the threaded block 15 and the screw is tightened, as a result of which the first plate 1 is displaced until the flattened tips of the spacers lie on top of one another and the spacing between the two plates is larger than in the non-displaced state. The filter covering 3 is only shown to some extent in this illustration.

Figure 9:
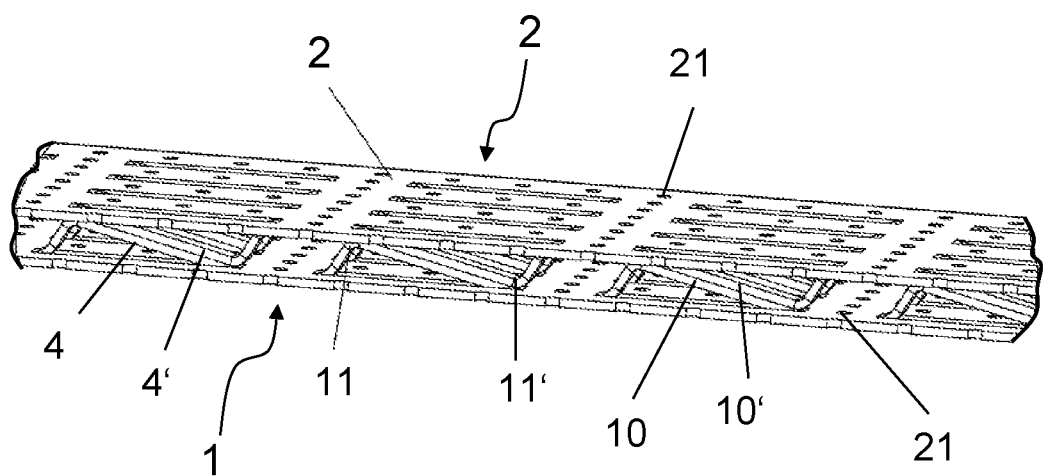
FIG. 9 shows a detail of a perspective view of a cross section through a further variant of a first and second perforated plate.

FIG. 9 shows a detail of a perspective view of a cross section through a further variant of the first and second perforated plates 1, 2 in the non-displaced state. The first plate 1 has spacers 4 with an oblique side surface 10 and a tip 11, and the second plate 2 has spacers 4' with an oblique side surface 10' and a tip 11'. In addition, the two plates have openings 21. The spacers have a rectangular cross section and an L-shaped longitudinal section. The tips 11, 11' of the spacers 4, 4' are not flattened.

Figure 10:
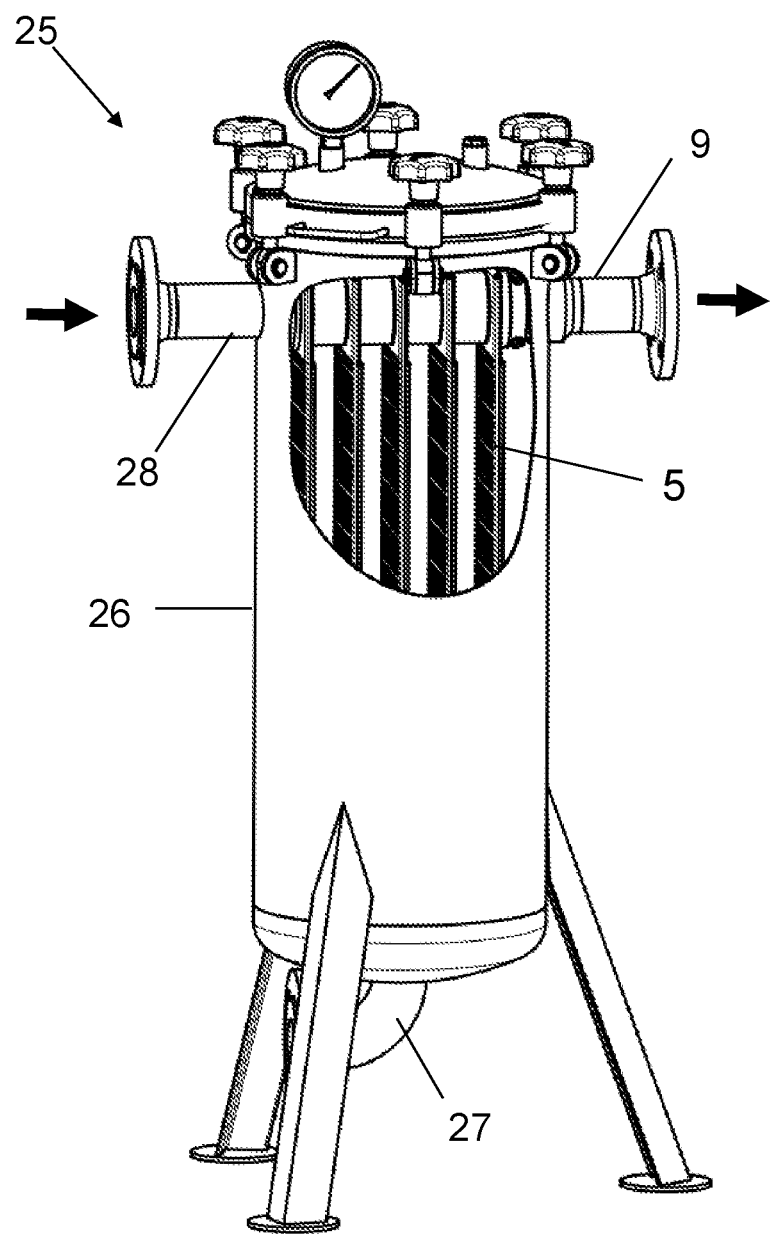
FIG. 10 shows a perspective view of a pressure vessel with filter elements.

FIG. 10 shows a device 25 with a pressure vessel 26, filter elements 5 (illustrated without a filter covering here), an inlet connection 28, through which the liquid to be filtered or the gas to be filtered flows into the pressure vessel 26 (arrow direction), a filtrate discharge pipe 9, through which the filtrate drains (arrow direction), and a discharge nozzle 27 for the solids removal. The device 25 has further elements, such as a pressure vessel lid with closure screws, pressure indicator and feet.

The filtration process takes place in such a manner that the pressure vessel 26 is filled with suspension or gas via the inlet connection 28. To this end, the atmosphere, for example air, located in the pressure vessel 26 is forced out of the filtrate discharge pipe 9 via the filter elements 5 and the liquid to be filtered or the gas to be filtered flows through the filter coverings 3 (not illustrated) on which the solid is retained, into the intermediate space between the two perforated plates, and via the filtrate discharge pipe 9 out of the device 25, where the filtrate, i.e. the filtered liquid or the filtered gas is collected. After the filtration is completed, the solid is detached from the filter coverings 3 (not illustrated) by backflushing with liquid or backblowing with gas through the filtrate discharge pipe (counter to the arrow direction) and if appropriate removed from the pressure vessel 26. To this end, either first the suspension still located in the pressure vessel 26 is emptied from the pressure vessel 26 via the discharge nozzle 27 and subsequently backflushed or the solid is first detached from the filter coverings and subsequently emptied together with the residual suspension via the discharge nozzle 27.

Although various embodiments of the present invention have been described and shown, the invention is not restricted thereto, but may also be embodied in other ways within the scope of the subject-matter defined in the following claims.

What is claimed is:

1. A filter element for separating solids from liquids or gases, the filter element having a first perforated plate and a second perforated plate, the two perforated plates being arranged parallel to one another and being covered by a filter covering, wherein the two perforated plates are displaceable in the longitudinal direction relatively to one another from a non-displaced state into a displaced state and the plates have spacers on the mutually facing inner sides, which spacers are constructed in such a manner that the spacing between the plates is larger in the displaced state than in the non-displaced state, so that the filter covering is tensioned in the displaced state of the plates, and wherein at least one latching element is provided, which fixes the plates to one another in the displaced state.

2. The filter element according to claim 1, wherein the spacers are of wedge-shaped construction.

3. The filter element according to claim 2, wherein the wedge-shaped spacers have a drop-shaped or rectangular cross section.

4. The filter element according to claim 3, wherein the oblique side surface of the wedge-shaped spacer of the first plate and the oblique side surface of the wedge-shaped spacer of the second plate are directed towards one another and run parallel to one another.

5. The filter element according to claim 2, wherein the wedge-shaped spacers each have a tip and each have an oblique side surface.

6. The filter element according to claim 5, wherein the tips of the wedge-shaped spacers of the two perforated plates are arranged offset to one another in the non-displaced state, and in that the tips of the wedge-shaped spacers of the two perforated plates lie in contact with one another on top of one another in the displaced state.

7. The filter element according to claim 5, wherein the wedge-shaped spacers have a drop-shaped or rectangular cross section.

8. The filter element according to claim 5, wherein the oblique side surface of the wedge-shaped spacer of the first plate and the oblique side surface of the wedge-shaped spacer of the second plate are directed towards one another and run parallel to one another.

9. The filter element according to claim 8, wherein the tips of the wedge-shaped spacers of the two perforated plates are arranged offset to one another in the non-displaced state, and in that the tips of the wedge-shaped spacers of the two perforated plates lie in contact with one another on top of one another in the displaced state.

10. The filter element according to claim 5, wherein the tip of the wedge-shaped spacers is flattened.

11. The filter element according to claim 10, wherein the wedge-shaped spacers have a drop-shaped or rectangular cross section.

12. The filter element according to claim 10, wherein the oblique side surface of the wedge-shaped spacer of the first plate and the oblique side surface of the wedge-shaped spacer of the second plate are directed towards one another and run parallel to one another.

13. The filter element according to claim 10, wherein the tips of the wedge-shaped spacers of the two perforated plates are arranged offset to one another in the non-displaced state, and in that the tips of the wedge-shaped spacers of the two perforated plates lie in contact with one another on top of one another in the displaced state.

14. The filter element according to claim 1, wherein the latching element is formed by two opposite wedge-shaped spacers, which are latched into one another in such a manner in the displaced state of the perforated plates, that in the latching position, a fixed spacing exists between the two perforated plates.

15. The filter element according to claim 1, wherein the latching element is formed by a screw mechanism, which comprises a screw and a threaded block and is arranged on a transverse side of the perforated plates.

16. The filter element according to claim 1, wherein the first perforated plate has an extension with a hole] for accommodating a filtrate discharge pipe.

17. A device for separating solids from liquids or gases, comprising a pressure vessel, a filtrate discharge pipe, and at least one filter element according to claim 1, arranged on the filtrate discharge pipe.

18. A method of separating solids from liquids and/or gases comprising:
providing a filter element having a first perforated plate and a second perforated plate, the two perforated plates being arranged parallel to one another and being covered by a filter covering, wherein the two perforated plates are displaceable in the longitudinal direction relatively to one another from a non-displaced state into a displaced state and the plates have spacers on the mutually facing inner sides, which spacers are constructed in such a manner that the spacing between the plates is larger in the displaced state than in the non-displaced state, so that the filter covering is tensioned in the displaced state of the plates, and wherein at least one latching element is provided, which fixes the plates to one another in the displaced state; and
capturing solids as a liquid and/or gas stream containing solids flows through the filter covering and into an interior of the filter element, the solids being retained on the filter covering.

* * * * *